Patented Aug. 11, 1931

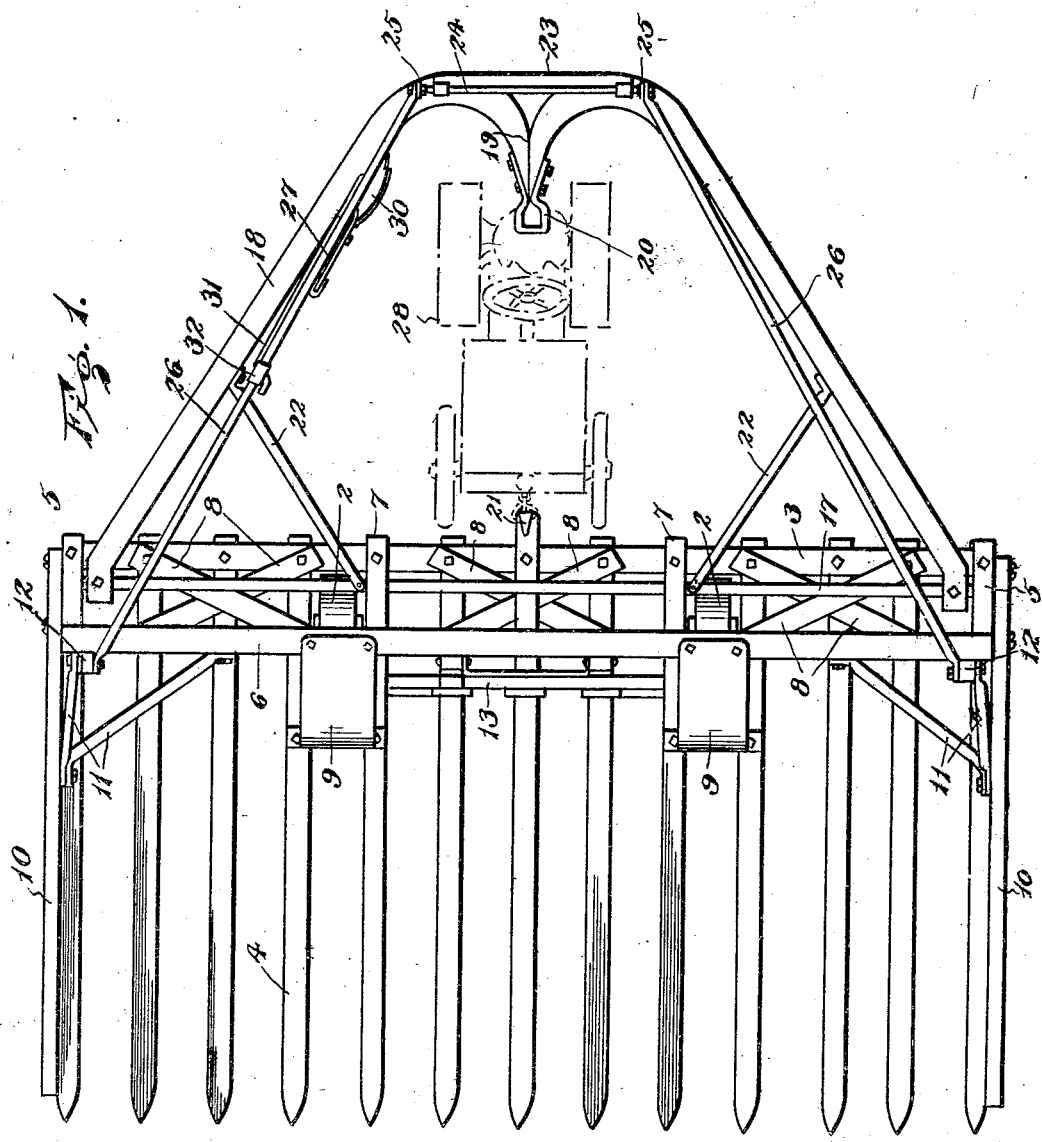

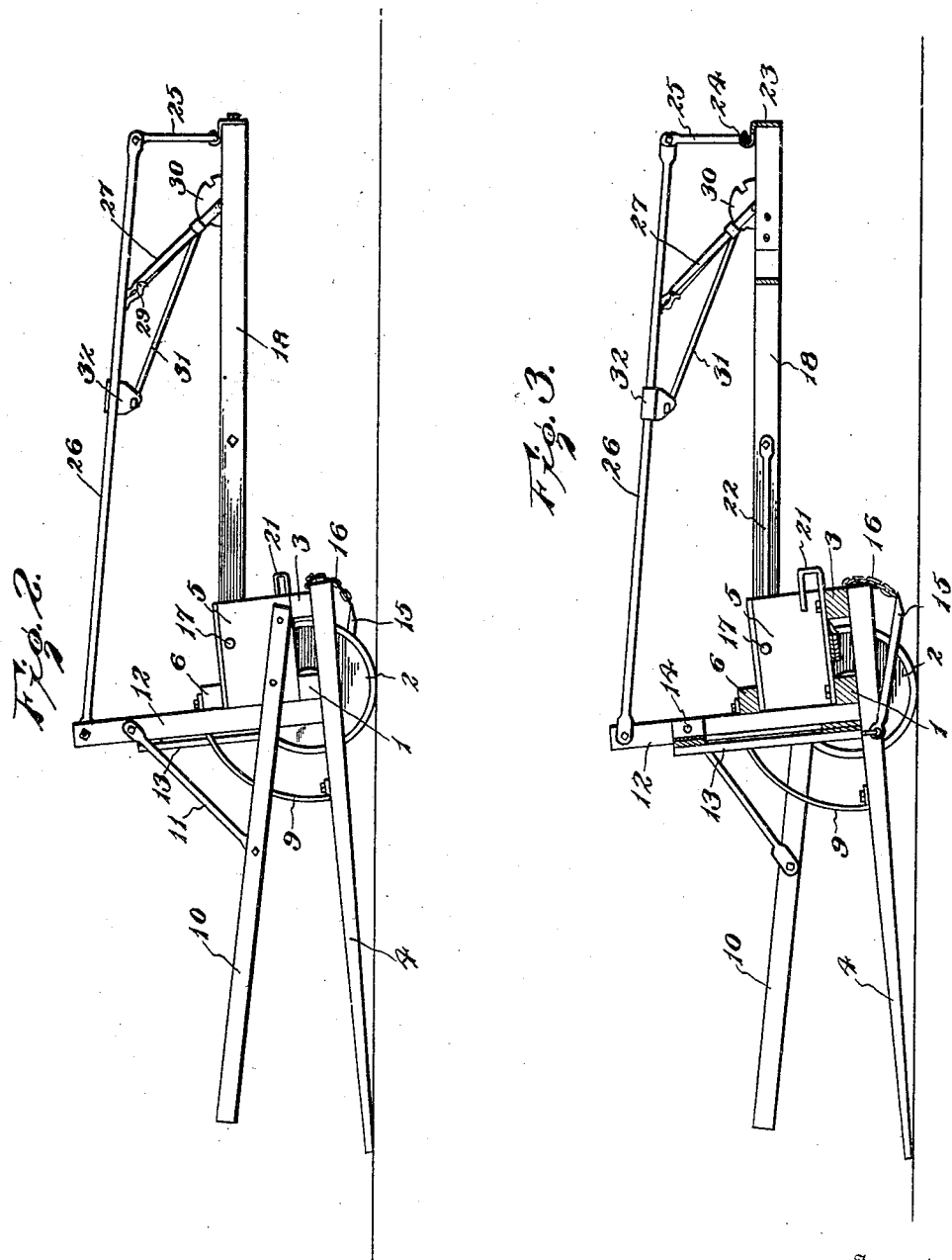

1,818,063

UNITED STATES PATENT OFFICE

BIRD C. HUFFMAN, OF TRYON, NEBRASKA

RAKE

Application filed March 13, 1929. Serial No. 346,685.

This invention relates to sweep rakes and has for its object the provision of simple and efficient means whereby the rake may be coupled to and propelled by a tractor. Another object of the invention is to provide tractor draft mechanism which may be readily connected to a rake of any known form and upon which will be mounted means for easily adjusting the rake. The invention is illustrated in the accompanying drawings and will be hereinafter fully set forth.

In the drawings:

Figure 1 is a top plan view of a rake having the present invention applied thereto, the position of the tractor being indicated by dotted lines, Fig. 2 is a side elevation, and Fig. 3 is a central longitudinal vertical section.

The rake comprises an axle member 1 upon which are mounted ground wheels 2 whereby the rake may travel easily over the field. At the rear of the axle and parallel therewith is a cross bar 3 and secured to the under side of the axle and the under side of the bar 3 are the rake teeth 4 which project forwardly and are of the usual or any approved form. At the ends of the axle and the cross bar 3 are end blocks 5 and secured to and extending between the forward corners of said blocks is an upper cross bar 6, as shown. At intermediate points of the axle and the cross bar 3, other blocks 7 are provided corresponding in all essential respects to the end blocks 5 so that a rigid structure is attained, and to further brace the structure and attain the desired rigidity cross braces 8 may be secured upon the axle and the cross bar at various points in the length of the same. Extending from the upper cross bar 6 downwardly and forwardly to the adjacent rake teeth are fenders or hoods 9 which are disposed in front of the respective ground wheels and serve to prevent the hay taken up by the rake teeth passing to the wheels and clogging the action of the same. Secured to and projecting forwardly from the end blocks 5 are the usual hay guards 10 disposed at the ends of the series of rake teeth and braces 11 extend between the guards and the cross bar 6 and between the guards and posts 12 which are erected upon the end rake teeth and are secured to the end blocks 5 and the upper cross bar 6 and project above said cross bar, as shown clearly in Figs. 2 and 3. Between the hoods 9, an apron 13 of any approved form is pivotally mounted upon a rod 14 extending between the posts and at the lower end of the gate is a prop 15 whereby it may be set in extended position and utilized to impart an initial movement to the hay when it is desired to unload the rake. The rear end of the prop is preferably connected with the rear cross bar 3 and held against loss by a chain 16, as shown and as will be understood.

Fitted in the several blocks 5 and 7 is a fulcrum rod 17 which extends the full width of the rake and about which the rake may turn so that the teeth may be lowered to the ground to take up the hay or raised from the ground in order to support the load taken up. Fitted to the ends of this fulcrum rod 17 is a draft frame 18 consisting of rearwardly converging side bars, shown clearly in Fig. 1, and having their rear ends curved inwardly toward each other and then extended forwardly with tapered terminals which meet and bear against each other, as shown at 19. These tapered ends are fitted within a bracket 20 which is bolted to the sides of the tapered end members and is constructed with an eye or loop whereby it may be connected to the drawbar of the tractor, as will be understood upon reference to Fig. 1. At the center of the rake, a hook 21 is secured upon the axle 1 and the rear cross bar 3 to receive a chain which may be attached to any convenient point of the front end of the tractor so that when the tractor is to make a turn at the end of a row or other point the rake will be forced to turn with the tractor and, consequently, steering will be easily effected and breakage, through possible impact of some part of the tractor with the side bars 18, will be avoided. Braces 22 extend forwardly and inwardly from the side bars 18 to the fulcrum rod 17, as shown in Fig. 1, so that a rigid structure is attained and the power of the tractor will be transmitted to the rake in such a manner as to efficiently effect travel of the rake. Mounted upon the rear end of the draft frame 18 is a cross bar or brace 23 and journaled upon said bar is a rock shaft 24 having normally upstanding cranks 25 at its ends. To the upper end of each crank 25 is pivoted the rear end of a connecting rod 26 which extends forwardly above the side bar of the draft frame and has its front end pivoted to the upper end of the respectively adjacent post 12, as shown and as will be understood. Obviously, if the shaft 24 be rocked, the motion will be transmitted through the cranks 25 and the connecting rods 26 to the posts 12 so that the rake structure will be pivotally swung upon the fulcrum rod 17 and the rake teeth consequently set to take up a load or to support a load which has been accumulated thereon. To effect the adjustment which has just been described, a hand lever 27 is mounted upon one of the side bars 18 in position to be easily reached by an operator upon the seat of the tractor, indicated at 28 in dotted lines, and this lever is equipped with a latch 29 of usual form cooperating with a segment 30 secured upon the side bar, as will be understood. A link 31 is pivoted at its rear end to the lever 27 and at its front end is pivotally engaged in a bracket 32 secured upon the adjacent connecting rod 26 so that any movement which may be given the hand lever will be transmitted directly to the connecting rods and the rake teeth, consequently, set as has been previously mentioned.

From the foregoing description, taken in connection with the accompanying drawings, it will be seen that I have provided a very simple and inexpensive draft apparatus which may be readily applied to a sweep rake and is especially adapted to connect the rake to a tractor for use in the field. It will also be noted that the rake teeth are easily adjusted from the seat of the tractor and the adjusting means consists of few parts which are simple in construction and are not apt to get out of order.

Having thus described the invention, I claim:

The combination with a sweep rake, of a draft frame comprising rearwardly converging side bars having their front ends pivotally connected with the rake and their rear ends defining forwardly curved terminals extending toward each other and meeting in tapered extremities, and a bracket fitted to and secured upon and projecting forwardly from said tapered terminals to be coupled to a tractor.

In testimony whereof I affix my signature.

BIRD C. HUFFMAN. [L. S.]